United States Patent Office 3,397,060
Patented Aug. 13, 1968

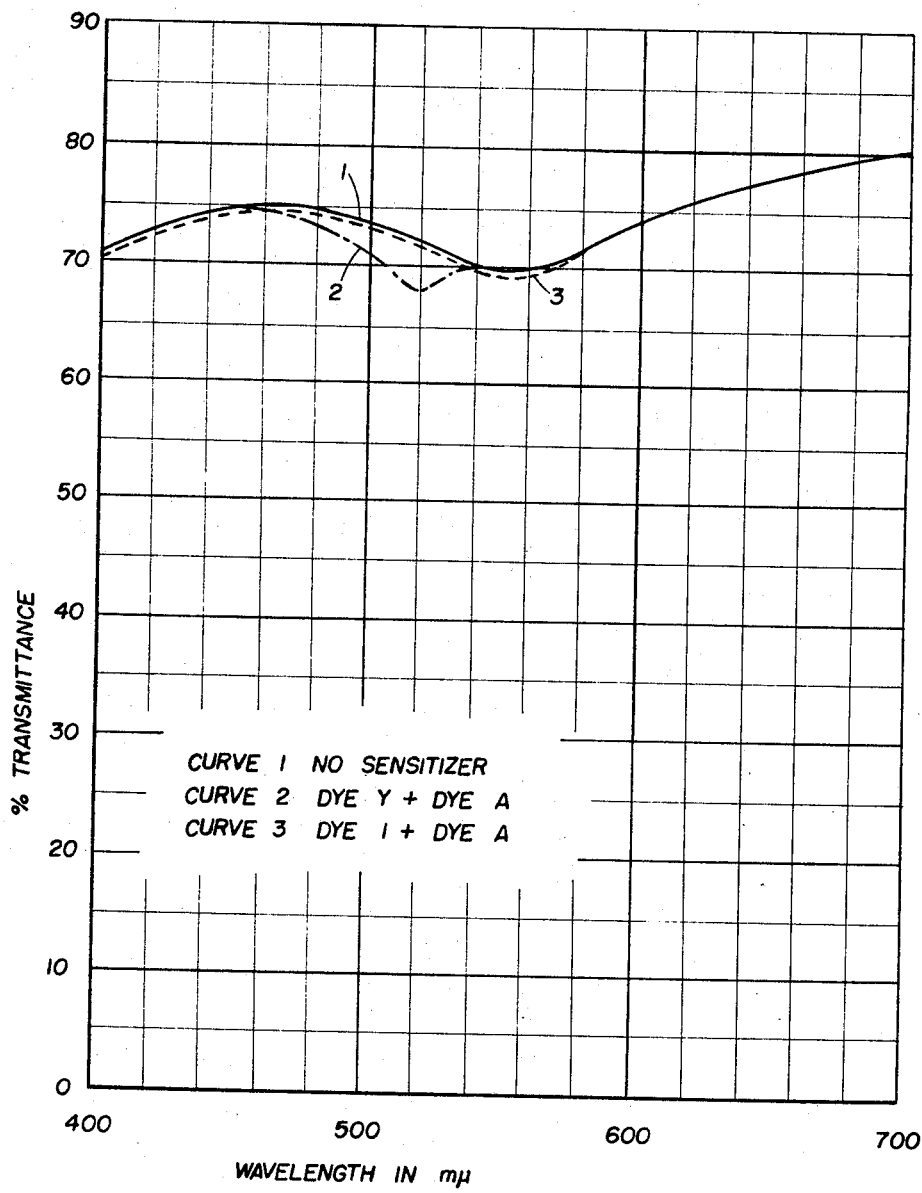

3,397,060
SUPERSENSITIZATION OF GREEN-SENSITIVE
SILVER HALIDE EMULSIONS
Judith A. Schwan and Jean E. Jones, Rochester, N.Y.,
assignors to Eastman Kodak Company, Rochester, N.Y.,
a corporation of New Jersey
Filed Oct. 19, 1964, Ser. No. 404,888
13 Claims. (Cl. 96—104)

ABSTRACT OF THE DISCLOSURE

Green-sensitized silver halide emulsions containing combinations of (1) an oxacarbocyanine dye which does not contain more than 1 phenyl substituent and (2) a benzimidazolocarbocyanine dye have substantially higher relative speeds and image dyes developed in these emulsions have higher stability on incubation (i.e., storage at elevated temperatures and humidities) than emulsions containing the corresponding dye combinations that are outside the immediate invention. The immediate dye combinations are further characterized by producing substantially no stain in the processed emulsions that contain them.

This invention relates to photographic silver halide emulsions containing supersensitizing dye combinations and, in particular, to supersensitizing combinations of certain oxacarbocyanine dyes with certain benzimidazolocarbocyanine dyes.

It is known in the art of making photographic emulsions that certain dyes of the cyanine class alter the sensitivity of photographic emulsions of the gelatino-silver halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

Supersensitizing dye combinations used previously in the green-sensitive emulsions for color photography have tended to produce a yellow- or a magenta-colored stain in the processed film or paper products. The use of known supersensitizing dye combinations in certain reversal color systems results in an unstable condition, as a result of which the color $D_{max}$ is reduced by incubation, that is, storage of the unprocessed reversal color element at elevated temperatures, especially at high humidities. The reduction in the color $D_{max}$ is a direct result of fog formation in the emulsion layer during incubation. Attempts to control this unstable condition by altering the relative amounts of the dyes in the combination have often resulted in a loss in green speed and an undesirable shift of the sensitizing maximum in the emulsion.

It is therefore an object of our invention to provide supersensitizing dye combinations for the green-sensitive emulsion layer of an element for color photography that produces less stain in the processed elements than available combinations.

It is another object of our invention to provide supersensitizing dye combinations for the green-sensitive emulsion layer of an element for color photography, that has good stability on incubation, that is, does not show a loss in green speed and/or $D_{max}$.

Still other objects will become apparent from the following specification and claims.

These and other objects are accomplished according to our invention by using a dye combination comprising (1) an oxacarbocyanine dye having no more than one phenyl substituent and (2) a dye from a certain class of benzimidazolocarbocyanine dyes. The immediate supersensitizing combinations provide a valuable technical advance in the art of photography.

The oxacarbocyanine dyes used to advantage according to our invention include those represented by the formula:

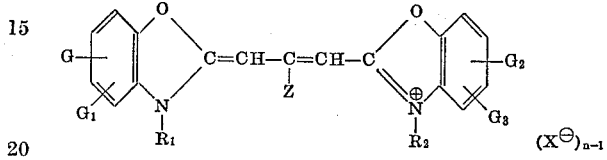

wherein G and $G_3$ each represents a group, such as, a halogen atom (e.g., chlorine, bromine, iodine, fluorine), the hydroxyl group, an alkoxy group (e.g., methoxy, ethoxy, propoxy, butoxy, etc.), an amino group (e.g., amino, methylamino, dimethylamino, diethylamino, etc.) an acylamido group (e.g., acetamido, propionamido, butyramido, etc.), an acyloxy group (e.g., acetoxy, propionoxy, etc.), a carbalkoxy group (e.g., carbethoxy, carbopropoxy, carbobutoxy, etc.), an alkoxycarbonyl amino group (e.g., ethoxycarbonylamino, propoxycarbonylamino, butoxycarbonylamino, etc.), and a phenyl group (e.g., phenyl, tolyl, etc.) such that not more than one of G and $G_3$ represents a phenyl group; $G_1$ and $G_2$ each represents the same or a different group (e.g., the hydrogen atom), a halogen atom (e.g., chlorine, bromine, fluorine and iodine); $R_1$ and $R_2$ each represents the same or a different alkyl group (e.g., methyl, ethyl, sulfoethyl, carboxyethyl, propyl, butyl, sulfobutyl, carboxybutyl, etc.); Z represents the hydrogen atom, an alkyl group (e.g., methyl ethyl, propyl, etc.), or an aryl group (e.g., phenyl, tolyl, etc.); $X^-$ represents an acid anion (e.g., chloride, bromide, iodide, thiocyanate, sulfamate, methyl sulfate, ethyl sulfate, perchlorate, p-toluenesulfonate, etc.); and $n$ represents an integer of from 1 to 2, such that $n$ represents the integer 1 when at least one of $R_1$ and $R_2$ represents a group selected from the class consisting of a sulfoalkyl group and a carboxyalkyl group.

The benzimidazolocarbocyanine dyes used to advantage according to our invention include those having the formula:

II 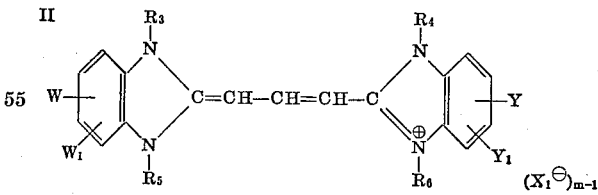

wherein W and Y each represents the same or different group such as, the hydrogen atom, a halogen atom (e.g., chlorine, bromine, iodine, fluorine), an alkoxy group (methoxy, ethoxy, butoxy, etc.), an amino group (e.g., amino, methylamino, dimethylamino, diethylamino, etc.), an acylamido group (e.g., acetamido, propionamido, butyramido, etc.), an acyloxy group (e.g., acetoxy, propionoxy, etc.), an alkoxycarbonylamino group (e.g., ethoxycarbonylamino, propoxycarboxylamino, etc.); $W_1$ and $Y_1$ each represents the same or different group, such as, the hydrogen atom, and a halogen atom (e.g., chlorine bromine, iodine, and fluorine); $R_3$ and $R_4$ each represents the same or a different alkyl group, such as, methyl, ethyl, propyl, butyl, etc; $R_5$ and $R_6$ each represents the same or a different alkyl group (e.g., methyl, ethyl sulfoethyl, carboxypropyl, butyl, sulfobutyl, etc.); $X_1^\ominus$ represents an acid anion (e.g., chloride, bromide, iodide, thiocyanate, sulfamate, methyl sulfate, ethyl sulfate, perchlorate, p-toluenesulfonate, etc.); and $m$ represents an integer of from 1 to 2, such that $m$ represents the integer 1 when at least one of $R_5$ and $R_6$ represents a group selected from the class consisting of a sulfoalkyl group and a carboxyalkyl group.

Typical examples illustrating the dyes of Formula I include those in which the substituents of the said formula are defined by the following table.

| Dye No. | G | $G_1$ | $G_2$ | $G_3$ | $R_1$ | $R_2$ | Z | $X^\ominus$ |
|---|---|---|---|---|---|---|---|---|
| 1 | 5-Cl | H | 5-Cl | H | Sulfopropyl | Sulfopropyl | Ethyl | None. |
| 2 | 5-Cl | H | 5-phenyl | H | Sulfobutyl | do | do | Do. |
| 3 | 5-methoxy | H | do | H | do | do | do | Do. |
| 4 | 5-Cl | H | 5-Cl | H | do | Sulfobutyl | do | Do. |
| 5 | 5-Br | H | 5-Br | H | Sulfopropyl | Sulfopropyl | do | Do. |
| 6 | 5-Cl | H | 5-Cl | H | Ethyl | Ethyl | do | Iodide. |
| 7 | 5-acetamido | H | 5-acetamido | H | Methyl | Methyl | do | Do. |
| 8 | do | H | do | H | Ethyl | Ethyl | do | Do. |
| 9 | 5-acetoxy | H | 5-acetoxy | H | do | do | Methyl | Perchlorate. |
| 10 | 5-carbethoxy | H | 5-carbethoxy | H | do | do | H | Iodide. |
| 11 | 5-hydroxy | H | 5-hydroxy | H | do | do | Ethyl | Perchlorate. |
| 12 | 5-methoxy | H | 5-methoxy | H | Sulfopropyl | Sulfopropyl | do | None. |

Typical examples illustrating the dyes of Formula II include those in which the substituents of the said formula are defined by the following table.

| Dye | W | $W_1$ | Y | $Y_1$ | $R_3$ | $R_4$ | $R_5$ | $R_6$ | $X_1^-$ |
|---|---|---|---|---|---|---|---|---|---|
| A | 5-Cl | 6-Cl | 5-Cl | 6-Cl | Ethyl | Ethyl | Ethyl | Sulfobutyl | None. |
| B | 5-Cl | 6-Cl | 5-Cl | 6-Cl | do | do | Sulfobutyl | do | Do. |
| C | 5-Br | 6-Br | 5-Br | 6-Br | do | do | Ethyl | do | Do. |
| D | 5-Cl | H | 5-Cl | H | do | do | do | Carboxyethyl | Do. |
| E | 5-acetamido | H | 5-acetamido | H | Methyl | Methyl | Methyl | Sulfobutyl | Do. |
| F | 5-acetoxy | H | 5-acetoxy | H | Ethyl | Ethyl | Ethyl | Sulfopropyl | Do. |
| G | 5-Cl | 6-Cl | 5-Cl | 6-Cl | do | do | do | Ethyl | Iodide. |

The dyes of Formulas I and II are known in the art and are described in patent references, such as, French patent 1,108,788, issued, Sept. 14, 1955; Sprague U.S. Patent 2,503,776, issued Apr. 11, 1950; Jones and Spence U.S. Patent 2,912,329, issued Nov. 10, 1959, etc. The methods for the preparation of dyes not specifically shown in these references will be apparent to those skilled in the art from a consideration of the cited references.

Acording to our invention, we incorporate in a silver halide emulsion one or more of the oxacarbocyanine dyes of Formula I described previously with one or more of the benzimidazolocarbocyanine dyes of Formula II described previously. Any of the silver halides are used to advantage in our emulsion, e.g., silver chloride, silver bromide, silver iodide, silver chlorobromide, silver bromoiodide, silver chlorobromiodide, etc. Our invention is particularly directed to the oridinarily employed gelatinosilver halide developing-out emulsions. However, our supersensitizing combinations can be employed in silver halide emulsions in which the carrier or vehicle is a hydrophilic colloid other than gelatin, such as, for example, albumin, agar-agar, gum arabic, alginic acid, etc., or a hydrophilic resin such as polyvinyl alcohol, polyvinyl pyrrolidone, a cellulose ether, a partially hydrolyzed cellulose acetate, etc., which has no deleterious effect upon the light-silver halide. The dyes of Formula I and Formula II can be employed in the combinations of the invention in various concentrations depending upon the particular emulsion, concentration of the silver halide, particular results desired, etc. The optimum concentration of a sensitizing dye can be determined in a manner well known to those skilled in the art by measuring the sensitivity of a series of test portions of the same emulsion, each portion containing a different concentration of the sensitizing dye. The optimum concentration of our supersensitizing combinations can, of course, be readily determined in the same manner, by measuring the sensitivity of a series of test portions of the same emulsion, each portion containing different concentrations of the individual dyes of the combination. In determining the optium concentration for the supersensitizing combination, it is advantageous to employ, at first, concentrations of the individual dyes less than their optimum concentrations. The concentrations of the individual dyes can then be increased until the optimum concentration of the supersensitizing combination is determined.

The methods of incorporating sensitizing dyes in silver halide emulsions are well known to those skilled in the art and these known techniques are employed in dispersing the dyes of our invention in the emulsions. These sensitizing dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the dyes can be separately dissolved in a given solvent and added separately to the emulsion, or they can be dissolved in the same or different solvent and these solutions mixed together before addition is made to the silver halide emulsions. The dyes can be dispersed in the finished emulsions and should be uniformly distributed throughout the emulsions before the emulsions are coated on a suitable support, such as, paper glass cellulose ester film, polyvinyl resin film (e.g., polystyrene film, polyvinyl chloride film, etc.), polyester film, etc. The following procedure has been found quite satisfactory: Stock solutions of the dye (or dyes) of Formula I and dye (or dyes) of Formula II are prepared by separately dissolving these dyes in appropriate solvents as described above. Then, the flowable silver halide emulsion the desired amount of stock solution of one of the dyes is slowly added while stirring the emulsion. Stirring is continued until the dye is thoroughly incorporated in the emulsion. Then, the desired amount of stock solution of the other dyes is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled inthe art. The foregoing procedure and proportions are to be regarded only as illustrative. Clearly, our invention is directed to any silver halide emulsion containing a combination of the aforesaid dyes whereby a supersensitizing effect is obtained.

The supersensitizing dye combinations of our invention are used to advantage for the sensitization of the silver halide emulsions used in a wide variety of products both color, and black and white. The emulsions include color positive emulsions, color negative emulsions, color reversal emulsions, (both with and without incorporated couplers), emulsions containing dye developers (of the type described in U.S. Patent 2,983,606), emulsions for the dye-bleach systems such as are described by Friedman's History of Color Photography published by the American Photographic Publishers Co., 1944, expecially in chapter 24; the British Jouranl of Photography vol. 111, pp. 308 and 309, Apr. 7, 1964, etc., and in black-and-white emulsions.

The dyes of Formula I having a carboxy alkyl or a sulfoalkyl group substituted on a heterocyclic nitrogen atom are preferred for use in emulsions that contain an incorporated coupler.

The following examples will serve to further illustrate the manner of practicing our invention as well as illustrate the technical advance provided by use of our invention.

Example 1

A series of multilayer color films was prepared as described below in which the only variable was the green sensitizer. A sulfur and gold-sensitized silver bromoiodide emulsion spectrally sensitized to the red region of the spectrum was coated directly on a film support. Over this was coated a layer containing a sulfur and gold-sensitized silver bromoiodide emulsion, spectrally sensitized with 225 mg. per mole of Ag, of Dye X, i.e., 9-ethyl-3,3'-di-($\beta$-methoxyethyl)-5,5'diphenyloxacarbocyanine iodide, a dye that is outside our invention, with 90 mg. per mole of Ag of Dye A. A yellow filter layer of CLS was coated next, followed by a sulfur and gold-sensitized, blue-sensitive emulsion layer. Three more multilayer color films were made as described except that in one of these Dye X was replaced with Dye 1, in the second of these Dye X was replaced with Dye 2, and in the third of these Dye X was replaced with Dye 3.

These color films were exposed with white light on an Eastman 1B Sensitometer and processed in the Kodachrome process (Eastman Kodak Co. trade name) described in the Kodachrome III Manual, 35 mm. published by the Eastman Kodak Company. The said manual is based on the Kodachrome Manual published in April 1961, and contains the supplements dated 1962, 1963, and 1964. From densitometer measurements made of the processed film samples, speed and stain data were obtained. The change in green $D_{max}$ on incubation at 120° F. and 50% RH for 7 days was obtained. These data are tabulated in Table 1.

TABLE 1

| Supersensitizing Dyes (mg. mole Ag)+(mg. mole Ag) | Relative Green Speed at D=.3 Below $D_{max}$ in Log E | Stain Density at 524 mu | Green $D_{max}$ Change on Incubation |
| --- | --- | --- | --- |
| Dye X (225)+Dye B (90) | (¹) | 0.20 | −0.52 |
| Dye 2 (225)+Dye B (90) | +0.14 | 0.17 | −0.51 |
| Dye 1 (225)+Dye B (90) | +0.16 | 0.14 | −0.36 |
| Dye 3 (225)+Dye B (90) | +0.13 | 0.16 | −0.37 |

¹ Reference.

A comparison of the results shows that in each instance the elements containing Dye 1, 2 or 3 were substantially better than the element containing Dye X (outside invention) for relative green speed and stain density. The stability of the green $D_{max}$ on incubation is better in each instance for our elements than the element outside our invention, particularly, the elements containing Dye 1 and Dye 3.

Example 2

Example 1 was repeated to compare an element containing Dye X with an element containing the same amount of Dye 4 in place of Dye X. The coatings were exposed, processed, densitometered and incubated as in Example 1. The results showed that our element containing Dye 4 was faster than the element containing Dye X by 0.14 log E, had lower stain and showed less green $D_{max}$ loss on incubation.

Example 3

Example 1 was repeated to compare a control element containing Dye X with an element containing the same amount of Dye 5 in place of Dye X. These elements were exposed, processed and measured as described in Example 1. The results showed that the element containing Dye 5 was faster by 0.16 log E than the control and also showed less stain.

Example 4

Single layer coatings of the incorporated coupler type which varied only in the green sensitizers were prepared and compared for stain. In these coatings a sulfur and gold-sensitized silver bromoiodide emulsion containing a dispersion of a magenta pyrazolone color-forming coupler of the type described in Fierke et al. U.S. Patent 2,801,171, issued July 30, 1957, was coated on a film support. Three coatings were made in which the indicated sensitizing dyes were used. Coatings were exposed and processed in the Kodak Ektachrome E-2 process (Eastman Kodak Company trade name), and spectral transmittance curves were made of the stain. The said process is described in "Instructions for Kodak Ektachrome Film Processing Kit Processes E-2 and E-3" published by Eastman Kodak Company and supplied with the Processing Kits.

TABLE 2

| Coating Number: | Sensitizing Dyes (mg./mole of Ag)+(mg./mole of Ag) |
| --- | --- |
| 1 | (¹) |
| 2 | Dye Y (100)+Dye A (60) |
| 3 | Dye 1 (100)+Dye A (60) |

¹ Unsensitized.

Dye Y is anhydro-9-ethyl-3,3'-disulfobutyl-5,5'-diphenyloxacarbocyanine hydroxide (a dye outside our invention). A comparison of the transmittance curves shows that coating 3 with our Dye 1 gives no stain since it is identical to the curve for coating 1. Coating 2 with Dye Y gives an appreciable amount of stain particularly at about 515 m$\mu$.

The accompanying drawing still further illustrates our invention by showing the spectral transmittance curves 1, 2 and 3 for coatings 1, 2 and 3 respectively of Example 4. These curves plot the transmittance percent vs. the wavelength in m$\mu$.

The preferred supersensitizing dye combinations of our invention have a monosulfoalkyl-substituted benzimidazolocarcyanine dye. These combinations are particularly valuable because of the greatly improved incubation stability and green speed given to silver halide emulsions containing them when used in certain reversal color systems. The following examples will serve to illustrate this effect.

Example 5

Single layer coatings were prepared which differed only in the green sensitizers. They consisted of sulfur and gold-sensitized silver bromoiodide emulsions coated directly on a cellulose acetate film support and overcoated with a gel layer. The coatings were exposed on an Eastman 1B Sensitometer through a No. 16 Wratten filter (Eastman Kodak Co. trademark), and processed in a magenta reversal process, using the prehardener, wash, negative development, wash, flash, magenta development, wash, bleach, fix, wash and drying steps of the process used in Example 1. Duplicate strips were incubated for 7 days at 120° F. and 50% RH and maximum density changes as a result of incubation were determined. This information is summarized in Table 3.

TABLE 3

| Coating No.: | Sensitized With Dye (mg./mole Ag) | Dye (mg./mole Ag) | Relative Speed at $D=0.3$ Below $D_{max.}$ Log E | Stain Density at 515 m$\mu$ | $D_{max.}$ Change on Incubation |
|---|---|---|---|---|---|
| 1 | X(225) | B(90) | (¹) | .142 | −.20 |
| 2 | 1(160) | B(160) | +0.09 | .10 | −.13 |
| 3 | 1(160) | A(160) | +0.21 | .10 | −.10 |
| 4 | (²) | (²) | | .10 | |

¹ Control.
² Unsensitized.

The results show that coatings 2 and 3 of our invention are substantially better than coating 1 (outside the invention) for speed, stain and stability on incubation. Neither of our coatings have any stain. Coating 3 compared with Coating 2 illustrates the improvement produced by using the preferred dyes of Formula II.

Example 6

Single layer coatings of the incorporated coupler types which varied only in the green sensitizers were prepared. They consisted of a sulfur and gold-sensitized silver bromo-iodide emulsion containing a dispersion of a magenta color-forming pyrazolone coupler of the type described in U.S. Patent 2,801,171, coated on cellulose acetate film support. The coatings were exposed on an Eastman 1B Sensitometer through a No. 16 Wratten filter and processed in the Kodak Ektachrome E–2 process (Eastman Kodak Trade Name). Duplicate strips were incubated for 7 days at 120° F. and 50% RH. The changes in $D_{max}$. resulting from incubation were determined. The data are summarized in Table 4.

TABLE 4

| Coating No. | Sensitized With Dye (mg./mole Ag)+(mg./mole Ag) | Relative Speed in Log E | $D_{max.}$ Change on Incubation |
|---|---|---|---|
| 1 | 1(105)+B(105) | (¹) | −.28 |
| 2 | 1(105)+A(105) | +0.02 | 0 |
| 3 | 1(180)+B(60) | (¹) | −.10 |
| 4 | 1(180)+A(60) | +0.16 | +.14 |

¹ Control.

The results show the advantages in speed and in stability on incubation obtained from using a preferred dye 4 Formula II over another dye of Formula II in an element containing incorporated coupler.

Example 7

A series of multilayer color film was prepared as described in Example 1, but using the combination of dyes indicated in Table 5. The coated film samples were exposed, processed and the stain data obtained as in Example 1. The results are summarized in Table 5.

TABLE 5

| Coating No. | Supersensitizing Combination Dye (mg./mole Ag)+Dye (mg./mole Ag) | Stain Density at 524 m$\mu$ |
|---|---|---|
| 1 | Y (100)+B (61) | .160 |
| 2 | 1 (100)+B (61) | .145 |
| 3 | Y (100)+A (61) | .155 |
| 4 | 1 (100)+A (61) | .145 |

The results show that coatings 2 and 4 of our invention have substantially lower stain levels than coatings 1 and 3 respectively.

Similarly it has been shown that silver halide emulsions containing supersensitizing dye combinations including other dyes of Formula I, such as, dyes 7, 8, 9, 10, 11, etc. with dyes of Formula II, such as A, B, etc., have a low propensity for stain formation.

The following example will serve to illustrate the supersensitizing effect of representative combinations of our invention.

Example 8

Portions of a silver bromoiodide emulsion of the type described by Trivelli and Smith, Phot. J. 79, 330 (1939) were sensitized with the single dye or dye combination indicated in Table 6. The dye or dyes dissolved in methanol were added to a portion of the melted emulsion. The emulsion was held at 50° C. for 10 minutes and then cooled, coated on a film support, chill-set, and dried. The coatings were exposed on an Eastman Sensitometer, Type IB, to a tungsten light source modulated by a step wedge and Wratten No. 16 and 61 filters, processed for 3 minutes in a developer having the composition:

| | Grams |
|---|---|
| p-methylaminophenol sulfate | 2 |
| Sodium sulfite, desiccated | 90 |
| Hydroquinone | 8 |
| Sodium carbonate, monohydrated | 52 |
| Potassium bromide | 5 |
| Water to make 1 liter. | | fixed in a conventional alkali metal thiosulfate fix, washed and dried. The relative speeds, gammas and fog values are summarized in the following table.

TABLE 6

| Coating No.: | Sensitizing Dye No. mg./mol (Ag) | Relative Speed | $\gamma$ | Fog |
|---|---|---|---|---|
| 1 | 1(165) | 100 | 1.14 | .06 |
| 2 | 1(82.5)+G(82.5) | 145 | 1.35 | .06 |
| 3 | G(165) | 138 | 1.12 | .08 |
| 4 | 2(165) | 120 | 1.27 | .08 |
| 5 | 2(82.5)+B(82.5) | 145 | 1.53 | .06 |
| 6 | B(165) | 100 | 1.34 | .06 |

In each instance our supersensitizing combination produced a significantly higher relative speed than the individual dyes.

The technical advances provided by use of our invention can be shown for combinations of our dyes of Formula I with our dyes of Formula II that have not been specifically illustrated herein. Our supersensitized emulsions are characterized by providing higher relative speeds, and substantially higher stability on incubation than the corresponding dye combinations that are outside our invention. Furthermore, our dye combinations are characterized by producing substantially no stain in the processed elements.

The invention has been described in detail with particular reference to preferred embodiments thereof, but it will be understood that variations and modifications can be effected within the spirit and scope of the invention as described hereinabove and as defined in the appended claims.

We claim:
1. A photographic silver halide emulsion containing a dye combination comprising
(1) an anhydro-oxacarbocyanine dye having the formula:

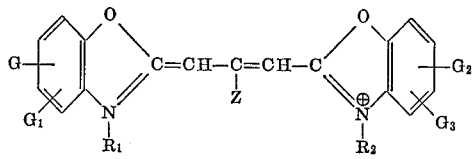

and
(2) an anhydro-benzimidazolocarbocyanine dye having the formula:

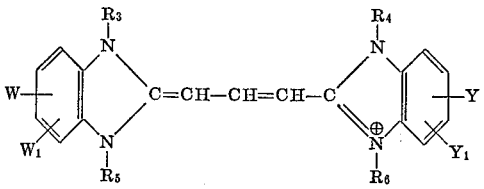

wherein G and $G_3$ each represent a group selected from the class consisting of a halogen atom, the hydroxyl group, an alkoxy group, an amino group, an acylamido group, an acyloxy group, a carbalkoxy group, an alkoxycarbonyl amino group and a phenyl group, such that not more than one of G and $G_3$ represents a phenyl group; $G_1$ and $G_2$ each represent a group selected from the class consisting of the hydrogen atom, and a halogen atom; Z represents a group selected from the class consisting of the hydrogen atom, an alkyl group and an aryl group; $R_1$ represents an alkyl group and $R_2$ represents an alkyl group such that at least one of $R_1$ and $R_2$ represents a group selected from the class consisting of sulfoalkyl group and a carboxyalkyl; W and Y each represents a group selected from the class consisting of the hydrogen atom, a halogen atom, an alkoxy group, an amino group, an acylamido group, an acyloxy group, and an alkoxycarbonyl amino group; $W_1$ and $Y_1$ each represents a group selected from the class consisting of the hydrogen atom and a halogen atom; $R_3$ represents an alkyl group; $R_4$ represents an alkyl group; $R_5$ and $R_6$ each represents a group selected from the class consisting of an alkyl group, a sulfoalkyl group, and a carboxyalkyl group such that at least one of $R_5$ and $R_6$ represents a group selected from the class consisting of a sulfoalkyl group and a carboxyalkyl group.

2. A photographic silver halide emulsion of claim 1 in which the oxacarbocyanine dye is anhydro - 5,5'- dichloro - 3,3' - disulfobutyl - 9 - ethyloxacarbocyanine hydroxide.

3. A photographic silver halide emulsion of claim 1 in which the oxacarbocyanine dye is anhydro - 5,5' - dichloro - 9 - ethyl - 3,3' - disulfopropyloxacarbocyanine hydroxide.

4. A photographic silver halide emulsion of claim 1 in which the oxacarbocyanine dye is anhydro - 5 - chloro-5' - phenyl - 9 - ethyl - 3 - sulfobutyl - 3' - sulfopropyloxacarbocyanine hydroxide.

5. A photographic silver halide emulsion of claim 1 in which the oxacarbocyanine dye is anhydro - 9 - ethyl-5 - methoxy - 5' - phenyl - 3 - sulfobutyl - 3' - sulfopropyloxacarbocyanine hydroxide.

6. A photographic silver halide emulsion of claim 1 in which the benzimidazolocarbocyanine dye is anhydro - 5, 5' - 6,6' - tetrachloro - 1,1',3 - triethyl - 3' - sulfobutyl-benzimidazolocarbocyanine hydroxide.

7. A photographic silver halide emulsion of claim 1 in which the benzimidazolocarbocyanine dye is anhydro- 5,5',6,6', - tetrachloro - 1,1' - diethyl - 3,3' - disulfobutyl-benzimidazolocarbocyanine hydroxide.

8. A photographic silver halide emulsion containing anhydro - 5,5' - dichloro - 9 - ethyl - 3,3' - disulfobutyl-oxacarbocyanine hydroxide and anhydro - 5,5',6,6', - tetra-chloro - 1,1' - diethyl - 3,3' - disulfobutylbenzimidazolo-carbocyanine hydroxide.

9. A photographic silver halide emulsion containing anhydro - 5,5, - dichloro - 9 - ethyl - 3,3' - disulfopropyloxa-carbocyanine hydroxide and anhydro - 5,5',6,6' - tetra-chloro - 1,1' - diethyl - 3,3' - disulfobutylbenzimidazolo-carbocyanine hydroxide.

10. A photographic silver halide emulsion containing anhydro - 9 - ethyl - 5 - methoxy - 5' - phenyl - 3 - sulfo-butyl - 3' - sulfopropyloxacarbocyanine hydroxide and anhydro - 5,5',6,6', - tetrachloro - 1,1' - diethyl - 3,3' - di-sulfobutylbenzimidazolocarbocyanine hydroxide.

11. A photographic silver halide emulsion containing anhydro - 5,5' - dichloro - 9 - ethyl - 3,3' - disulfo-propyloxacarbocyanine hydroxide and anhydro - 5,5',6,6'-tetrachloro - 1,1',3 - triethyl - 3' - sulfobutylbenzimida-zolocarbocyanine hydroxide.

12. A photographic silver halide emulsion of claim 1 containing a magenta color-forming pyrazolone coupler.

13. A photographic element comprising a support and at least one photopraphic silver halide emulsion layer containing a combination comprising:
(1) an anhydro-oxacarbocyanine dye having the formula:

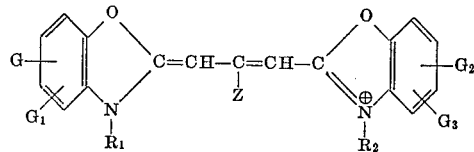

and
(2) an anhydro-benzimidazolocarbocyanine dye having the formula:

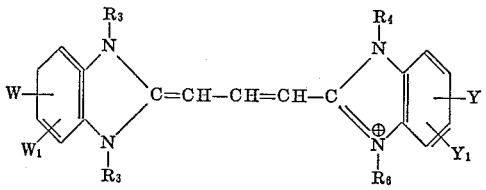

wherein G and $G_3$ each represent a group selected from the class consisting of a halogen atom, the hydroxyl group, an alkoxy group, an amino group, an acylamido group, an acyloxy group, a carbalkoxy group, an alkoxycarbonyl amino group, and a phenyl group, such that not more than one of G and $G_3$ represents a phenyl group; $G_1$ and $G_2$ each represent a group selected from the class consisting of the hydrogen atom, and a halogen atom; Z represents a group selected from the class consisting of the hydrogen atom, an alkyl group and an aryl group; $R_1$ represents an alkyl group and $R_2$ represents an alkyl group such that at least one of $R_1$ and $R_2$ represents a group selected from the class consisting of a sulfoalkyl group and a carboxy-alkyl group; W and Y each represents a group selected from the class consisting of the hydrogen atom, a halogen atom, an alkoxy group, an amino group, an acylamido group, an acyloxy group, and an alkoxycarbonylamino group; $W_1$ and $Y_1$ each represents a group selected from the class consisting of the hydrogen atom and a halogen atom; $R_3$ represents an alkyl group; $R_4$ represents an alkyl group; $R_5$ and $R_6$ each represents a group selected from the class consisting of an alkyl group, a sulfoalkyl group, and a carboxyalkyl group such that at least one of $R_5$ and $R_6$ represents a group selected from the class consisting of a sulfoalkyl group and a carboxyalkyl group.

References Cited

UNITED STATES PATENTS 2,688,545   9/1954   Carroll et al. _____ 96—104

J. TRAVIS BROWN, *Primary Examiner.*

UNITED STATES PATENT OFFICE
CERTIFICATE OF CORRECTION

Patent No. 3,397,060                      August 13, 1968

Judith A. Schwan et al.

It is certified that error appears in the above identified patent and that said Letters Patent are hereby corrected as shown below:

Column 9, lines 5 to 12, the left-hand portion of the formula should appear as shown below:

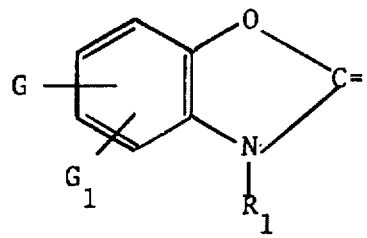

Column 10, line 4, "-5,5," should read -- -5,5´- --; lines 36 to the formula should appear as shown below:

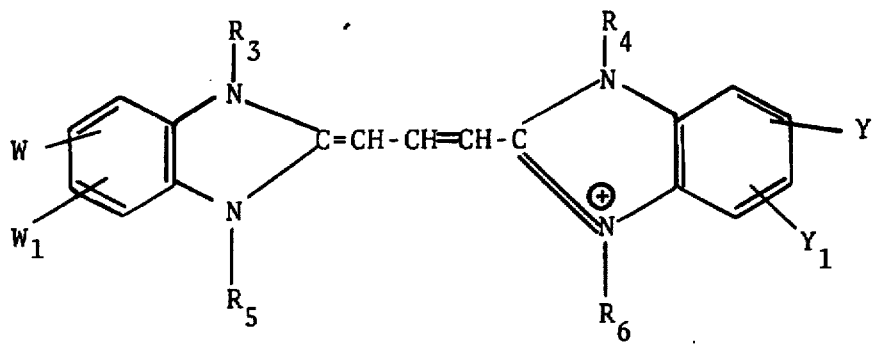

Signed and sealed this 12th day of May 1970.

(SEAL)
Attest:

EDWARD M. FLETCHER, JR.            WILLIAM E. SCHUYLER, JR
Attesting Officer                   Commissioner of Patents